(12) United States Patent
Hu

(10) Patent No.: US 12,416,411 B2
(45) Date of Patent: Sep. 16, 2025

(54) INJECTOR WITH TANGENTIAL FEED CONDUITS FOR HYDROGEN-DRIVEN GAS TURBINE ENGINE

(71) Applicant: PRATT & WHITNEY CANADA CORP., Longueuil (CA)

(72) Inventor: Tin Cheung John Hu, Markham (CA)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/423,788

(22) Filed: Jan. 26, 2024

(65) Prior Publication Data

US 2024/0263794 A1    Aug. 8, 2024

Related U.S. Application Data

(60) Provisional application No. 63/482,821, filed on Feb. 2, 2023.

(51) Int. Cl.
*F23R 3/28* (2006.01)
*F02C 3/22* (2006.01)
*F23R 3/12* (2006.01)

(52) U.S. Cl.
CPC .......... *F23R 3/286* (2013.01); *F02C 3/22* (2013.01); *F23R 3/12* (2013.01); *F05D 2250/322* (2013.01)

(58) Field of Classification Search
CPC .... F23R 3/12; F23R 3/28; F23R 3/286; F23R 3/30; F23R 3/343; F23R 2900/03343; F23D 14/02; F23D 14/62; F23D 14/64; F23D 2900/14021; F23D 2900/14701; F23C 2900/07001; F23C 7/002
See application file for complete search history.

(56) References Cited

U.S. PATENT DOCUMENTS

| | | | |
|---|---|---|---|
| 1,591,679 A * | 7/1926 | Hawley | F23C 3/008 110/308 |
| 4,133,633 A * | 1/1979 | Fehler | F23R 3/02 431/352 |
| 4,578,946 A | 4/1986 | Readman et al. | |
| 5,479,781 A | 1/1996 | Fric et al. | |
| 5,836,289 A | 11/1998 | Thring | |
| 6,145,496 A | 11/2000 | Pace et al. | |
| 6,267,585 B1 | 7/2001 | Suttrop | |
| 6,354,072 B1 | 3/2002 | Hura | |

(Continued)

OTHER PUBLICATIONS

European Search Report for European Patent Application No. 24155556.4 mailed May 13, 2024.

*Primary Examiner* — Alain Chau
(74) *Attorney, Agent, or Firm* — Carlson, Gaskey & Olds, P.C.

(57) ABSTRACT

An injector for introducing hydrogen and gas into a combustion chamber of a gas turbine engine includes a convergent-divergent nozzle head and a hydrogen/gas feed nozzle. The convergent-divergent nozzle head is arranged along a nozzle axis and has an upstream end defining an inlet mouth. The hydrogen/gas feed nozzle includes a mixing chamber arranged along the nozzle axis upstream of the inlet mouth, first feed conduits configured to feed hydrogen into the mixing chamber, and second feed conduits configured to feed gas into the mixing chamber. Each of the first feed conduits and the second feed conduits are tangentially oriented to the mixing chamber.

12 Claims, 3 Drawing Sheets

(56) References Cited

U.S. PATENT DOCUMENTS

| | | | |
|---|---|---|---|
| 6,684,640 B2 * | 2/2004 | McMillan | F23R 3/286 |
| | | | 60/737 |
| 7,017,329 B2 | 3/2006 | Farhangi et al. | |
| 7,832,212 B2 * | 11/2010 | Bunker | F23D 14/62 |
| | | | 60/737 |
| 8,047,001 B2 * | 11/2011 | Beeck | F02C 3/16 |
| | | | 60/737 |
| 8,365,531 B2 | 2/2013 | Pidcock et al. | |
| 8,596,070 B2 | 12/2013 | Yoshida et al. | |
| 8,739,511 B1 | 6/2014 | Toqan et al. | |
| 9,038,392 B2 | 5/2015 | Yuasa et al. | |
| 9,310,080 B2 | 4/2016 | Toon | |
| 10,125,982 B2 * | 11/2018 | Graichen | F23D 14/82 |
| 10,480,414 B2 * | 11/2019 | Isono | F23R 3/343 |
| 10,865,989 B2 * | 12/2020 | Sadasivuni | F23R 3/286 |
| 2002/0112480 A1 * | 8/2002 | McMillan | F23R 3/286 |
| | | | 60/737 |
| 2008/0104961 A1 * | 5/2008 | Bunker | F23D 14/62 |
| | | | 60/737 |
| 2008/0110173 A1 * | 5/2008 | Bunker | F23D 14/62 |
| | | | 60/737 |
| 2009/0081048 A1 * | 3/2009 | Beeck | F23R 3/14 |
| | | | 415/115 |
| 2009/0123882 A1 * | 5/2009 | Eroglu | F23R 3/286 |
| | | | 431/278 |
| 2009/0249789 A1 | 10/2009 | Zuo et al. | |
| 2010/0275604 A1 | 11/2010 | Hall | |
| 2016/0032842 A1 * | 2/2016 | Isono | F23R 3/14 |
| | | | 60/725 |
| 2017/0211807 A1 * | 7/2017 | Graichen | F23R 3/283 |
| 2018/0135859 A1 * | 5/2018 | Sadasivuni | F23R 3/14 |

* cited by examiner

INJECTOR WITH TANGENTIAL FEED CONDUITS FOR HYDROGEN-DRIVEN GAS TURBINE ENGINE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Present gas turbine engines use liquid hydrocarbon fuels (LHF). LHF is provided through a fuel supply system and introduced into the combustor by liquid injectors. The fuel supply system and liquid injectors are designed for handling and efficient burning of the LHF. For instance, as liquid is much denser than the air (gas) it is to be mixed with, it is necessary for the liquid injectors to atomize the LHF into tiny droplets in order to facilitate more uniform burning. More recently it has been proposed to utilize hydrogen ($H_2$) as a fuel.

SUMMARY

An injector for a gas turbine engine includes a convergent-divergent nozzle head and a hydrogen/gas feed nozzle. The convergent-divergent nozzle head is arranged along a nozzle axis and has an upstream end defining an inlet mouth. The hydrogen/gas feed nozzle includes a mixing chamber arranged along the nozzle axis upstream of the inlet mouth, first feed conduits configured to feed hydrogen into the mixing chamber, and second feed conduits configured to feed gas into the mixing chamber. Each of the first feed conduits and the second feed conduits are tangentially oriented to the mixing chamber.

An example gas turbine engine according to an example of the present disclosure includes a combustor section that has a combustion chamber, a hydrogen source, and an injector as in any of the foregoing examples.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
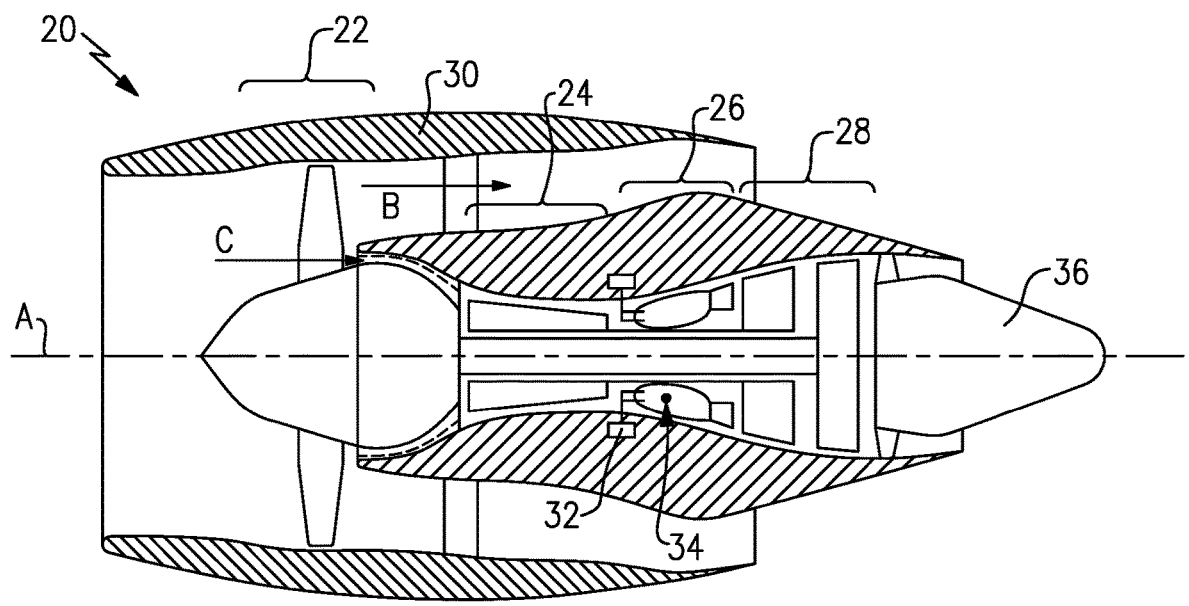
FIG. 1 illustrates a gas turbine engine.

FIG. 1 schematically illustrates a gas turbine engine 20. The example gas turbine engine 20 is a turbofan that generally incorporates a fan section 22, a compressor section 24, a combustor section 26, and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air or other combustion gas is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller.

While present gas turbine engines use liquid hydrocarbon fuels (LHF), the engine 20 of the present disclosure is designed to use gaseous fuel, such as hydrogen, in the fuel system 32. In this regard, the fuel system 32 may carry liquid cryogenic hydrogen or gaseous hydrogen, both of which are provided to the combustor section 26 as gaseous hydrogen. A challenge to using hydrogen is that because it is a gas, its handling and combustion properties differ from that of LHF. For instance, hydrogen does not require atomization like a liquid, and hydrogen has higher flammability and different flame characteristics than LHF. Accordingly, injector nozzles that are designed for hydrogen are needed. In these regards, the engine 20 includes one or more injectors 38 for introducing the hydrogen fuel into the combustor section 26.

Figure 2:
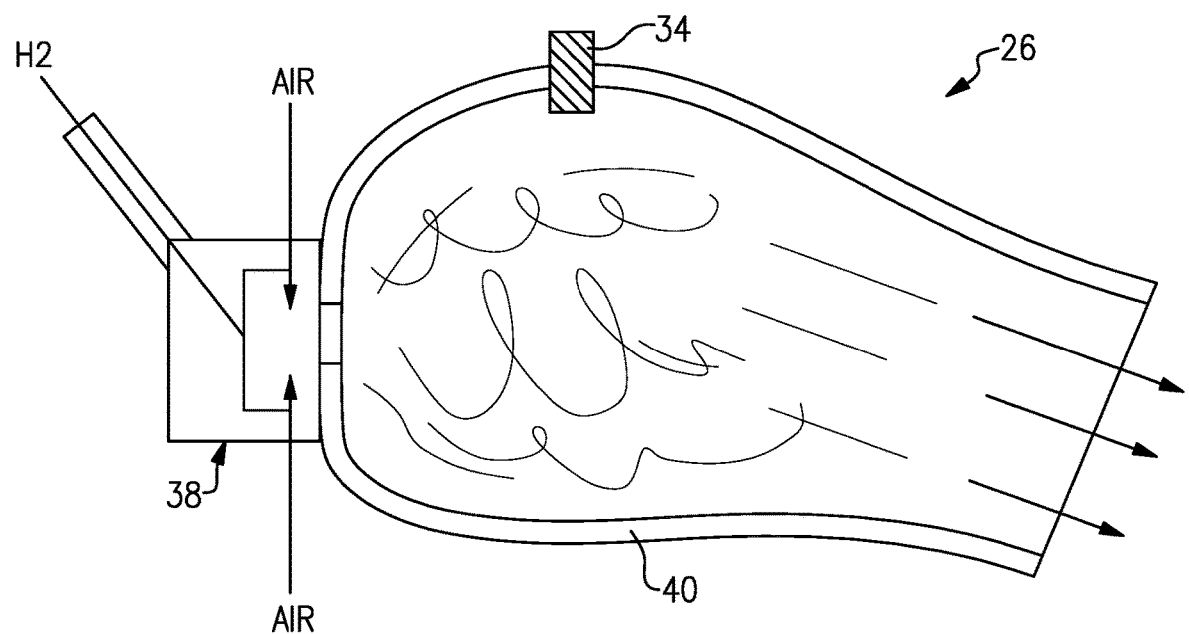
FIG. 2 illustrates the combustor of the engine and an injector.
Figure 3:
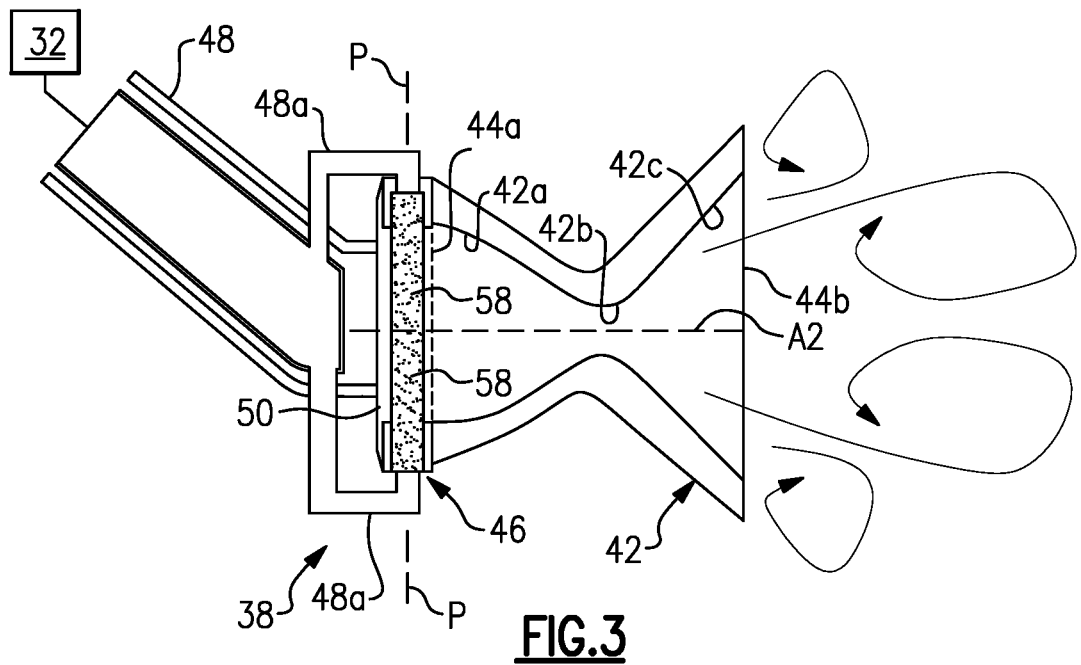
FIG. 3 illustrates an isolated view of an example injector.

As shown in FIG. 2, the injector 38 is arranged on a combustion chamber 40 of the combustor section 26 for introducing hydrogen and gas (e.g., air in the examples herein). FIG. 3 illustrates an isolated view of an example of the injector 38. The injector 38 includes a nozzle head 42 that defines a nozzle axis A2. The nozzle head 42 is a convergent-divergent nozzle that includes a convergent section 42a that has an inlet mouth 44a at its upstream end. The convergent section 42a narrows to a throat 42b, which then expands into a divergent section 42c. The divergent section 42c defines an exit 44b into the combustion chamber 40.

The injector 38 further includes a hydrogen/gas feed nozzle 46 arranged along the nozzle axis A2 upstream of the inlet mouth 44a and configured to swirl a flow of the hydrogen and gas to the inlet mouth 44a. A feed conduit 48 connects the hydrogen/has feed nozzle 46 with the fuel system 32 (hydrogen source). A "conduit" as used herein is defined by one or more structures that together convey a fluid from one point to another. For example, a conduit conveying fluid from point A to point B may include one of, or a combination of: a tube, an aperture defined through a part of an engine, a filter, a pump, and so on, depending on the application and context as would be understood by a person of ordinary skill in the art reading the present disclosure.

The hydrogen/gas feed nozzle 46 includes a mixing chamber 50, first feed conduits 52 (FIG. 4), and second feed conduits 54. The mixing chamber 50 is a generally circular chamber and is arranged along the nozzle axis A2 upstream of the inlet mouth 44*a*. The first feed conduits 52 are configured to feed hydrogen into the mixing chamber 50, the second feed conduits 54 are configured to feed air into the mixing chamber 50. In this regard, the feed conduit 48 splits into two or more ancillary feed conduits 48*a* upstream of the first feed conduits 52, with each ancillary feed conduit 48*a* connecting to one of the first feed conduits 52. The second feed conduits 54 are connected to an air source, such as the compressor section 24, or other combustion gas source if not air.

Figure 4:
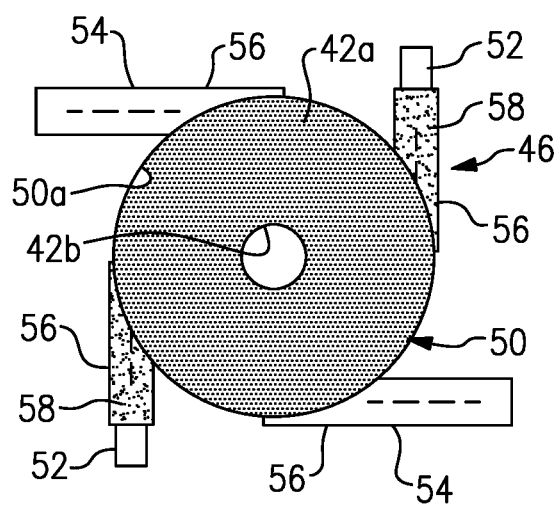
FIG. 4 illustrates a front view of the example injector.

The first feed conduits 52 and each of the second feed conduits 54 are in a common plane P (FIG. 3) through the mixing chamber 50 and are tangentially oriented to the mixing chamber 50, as shown in the axial view in FIG. 4. For instance, the outer walls 56 of each feed conduits 52/54 are substantially tangent (within +/−5°) to the outer wall 50*a* of the mixing chamber 50. The first feed conduits 52 and the second feed conduits 54 alternate around the mixing chamber 50. In the illustrated example, there are two first feed conduits 52 and two second feed conduits 54, and all of the feed conduits 52/54 are oriented in a common clock-wise direction about the nozzle axis A2 (looking downstream). The first feed conduits 52 are located approximately 180° opposite each other, and the second feed conduits 54 are located approximately 180° opposite each other. It is to be appreciated that additional feed conduits 52/54 could be included and that the feed conduits 52/54 could alternatively be oriented in a common counter clock-wise direction about the nozzle axis A2.

The tangential orientations of the feed conduits 52/54 expels the hydrogen and air (or other combustion gas) into the mixing chamber 50 with a swirling flow about the nozzle axis A2, thereby facilitating mixing of the hydrogen and air in the mixing chamber 50 before flowing into the convergent section 42*a* of the nozzle head 42 for further mixing. Additionally, the alternating arrangement of the feed conduits 52/54 ensures that the air expelled from the second feed conduits 54 jets into the flow of hydrogen from the next adjacent feed conduit 52, thereby enhancing mixing of the hydrogen and air.

The first feed conduits 52 also serve as a flame arrestor, allowing feed flow of hydrogen but facilitating the prevention of flame propagation back through the injector 38. For example, the first feed conduits 52 include an open-cell metallic foam 58 disposed therein. The cells of the foam 58 create a tortuous path for flow of the hydrogen, thereby reducing the flow velocity of the hydrogen. The reduced velocity of the hydrogen expelled into the mixing chamber 50 facilitates mixing with faster-moving, swirling air. For instance, the open-cell metallic foam 58 is formed of Ni—an alloy that has low susceptibility to hydrogen embrittlement, such as but not limited to, stainless steel or nickel alloy, and which is corrosion resistant and temperature resistant at the expected operating conditions.

Figure 5:
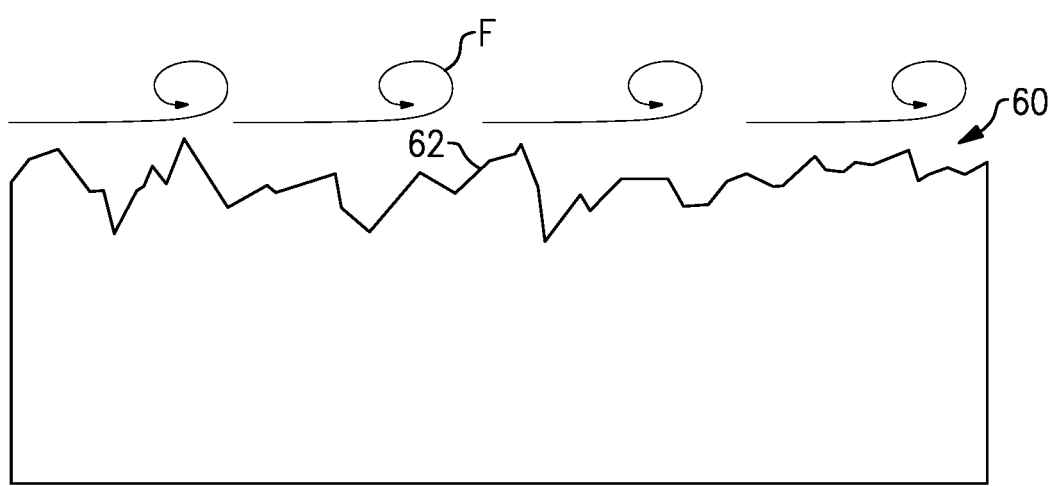
FIG. 5 illustrates a surface-treated surface to facilitate mixing.

In further examples, select surfaces of the injector 38 that are in contact with hydrogen or air may be surface-treated to further enhance mixing. FIG. 5 shows an example surface 60, which may be a surface of the mixing chamber 50 and/or a surface of the nozzle head 42. The surface 60 has been treated to have a surface roughness 62 of 100-30 Ra. The surface roughness 62 induces turbulent flow F, contributing to mixing of the hydrogen and air.

This disclosure may be further understood in view of the following examples. An injector 38 for a gas turbine engine 20 according to an example of the present disclosure includes a convergent-divergent nozzle head 42 and a hydrogen/gas feed nozzle 46. The convergent-divergent nozzle head 42 is arranged along a nozzle axis A2 and has an upstream end defining an inlet mouth 44*a*. The hydrogen/gas feed nozzle 46 includes a mixing chamber 50 arranged along the nozzle axis A2 upstream of the inlet mouth 44*a*, first feed conduits 52 configured to feed hydrogen into the mixing chamber 50, and second feed conduits 54 configured to feed gas into the mixing chamber 50. Each of the first feed conduits 52 and the second feed conduits 54 are tangentially oriented to the mixing chamber 50.

In a further example of the foregoing example, the first feed conduits 52 and the second feed conduits 54 are disposed in a common plane P through the mixing chamber 50.

In a further example of any of the foregoing examples, the first feed conduits 52 and the second feed conduits 54 alternate around the mixing chamber 50.

In a further example of any of the foregoing examples, the first feed conduits 52 and the second feed conduits 54 are oriented in a common clock-wise direction or a common counter clock-wise direction about the nozzle axis A2.

In a further example of any of the foregoing examples, two of the first feed conduits 52 are located approximately 180° opposite each other, and two of the second feed conduits 54 are located approximately 180° opposite each other.

In a further example of any of the foregoing examples, the hydrogen/gas feed nozzle 46 includes an open-cell metallic foam 58 disposed in the first feed conduits 52.

In a further example of any of the foregoing examples, the mixing chamber 50 includes a chamber surface 60 and the convergent-divergent nozzle head 42 includes a nozzle surface 60 that have surface roughnesses 62 of 100-300 Ra.

An example gas turbine engine 20 according to an example of the present disclosure includes a combustor section 24 that has a combustion chamber 40, a hydrogen source 32, and an injector 38 as in any of the foregoing examples.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An injector for a gas turbine engine comprising:
 a convergent-divergent nozzle head arranged along a nozzle axis and having an upstream end defining an inlet mouth; and
 a hydrogen/gas feed nozzle including
  a mixing chamber arranged along the nozzle axis upstream of the inlet mouth,
  first feed conduits configured to feed hydrogen into the mixing chamber, each of the first feed conduits being tangentially oriented to the mixing chamber, each of the first feed conduits including a downstream end that opens into the mixing chamber, second feed channels configured to feed gas into the mixing chamber, each of the second feed conduits being tangentially oriented to the mixing chamber, and an open-cell metallic foam disposed in the downstream end of each of the first feed conduits, and wherein the mixing chamber includes a chamber surface and the convergent-divergent nozzle head includes a nozzle surface that have surface roughnesses of 100-300 Ra in order to induce turbulent flow.

2. The injector as recited in claim 1, wherein the first feed conduits and the second feed conduits are disposed in a common plane through the mixing chamber.

3. The injector as recited in claim 2, wherein the first feed conduits and the second feed conduits alternate around the mixing chamber.

4. The injector as recited in claim 1, wherein the first feed conduits and the second feed conduits are oriented in a common clock-wise direction or a common counter clock-wise direction about the nozzle axis.

5. The injector as recited in claim 1, wherein two of the first feed conduits are located approximately 180° opposite each other, and two of the second feed conduits are located approximately 180° opposite each other.

6. The injector as recited in claim 1, wherein the convergent-divergent nozzle includes an exit opening into a combustion chamber, the inlet mount having an inlet mouth diameter and the exit having an exit diameter that is greater than the inlet mouth diameter.

7. A gas turbine engine comprising:
a combustor section having a combustion chamber;
a hydrogen source; and
an injector for introducing hydrogen from the hydrogen source and gas into the combustion chamber, the injector including
a convergent-divergent nozzle head arranged along a nozzle axis and having an upstream end defining an inlet mouth, and
a hydrogen/gas feed nozzle including
a mixing chamber arranged along the nozzle axis upstream of the inlet mouth,
first feed conduits configured to feed hydrogen into the mixing chamber, each of the first feed conduits being tangentially oriented to the mixing chamber, each of the first feed conduits including a downstream end that opens into the mixing chamber,
second feed conduits configured to feed gas into the mixing chamber, each of the second feed conduits being tangentially oriented to the mixing chamber, and an open-cell metallic foam disposed in the downstream end of each of the first feed conduits, and wherein the mixing chamber includes a chamber surface and the convergent-divergent nozzle head includes a nozzle surface that have surface roughnesses of 100-300 Ra in order to induce turbulent flow.

8. The gas turbine engine as recited in claim 7, wherein the first feed conduits and the second feed conduits are disposed in a common plane through the mixing chamber.

9. The gas turbine engine as recited in claim 8, wherein the first feed conduits and the second feed conduits alternate around the mixing chamber.

10. The gas turbine engine as recited in claim 7, wherein the first feed conduits and the second feed conduits are oriented in a common clock-wise direction or a common counter clock-wise direction about the nozzle axis.

11. The gas turbine engine as recited in claim 7, wherein two of the first feed conduits are located approximately 180° opposite each other, and two of the second feed conduits are located approximately 180° opposite each other.

12. An injector for a gas turbine engine comprising:
a convergent-divergent nozzle head arranged along a nozzle axis and having an upstream end defining an inlet mouth; and
a hydrogen/gas feed nozzle including
a mixing chamber arranged along the nozzle axis upstream of the inlet mouth,
first feed conduits configured to feed hydrogen into the mixing chamber, each of the first feed conduits being tangentially oriented to the mixing chamber,
second feed channels configured to feed gas into the mixing chamber, each of the second feed conduits being tangentially oriented to the mixing chamber, and
the mixing chamber including a chamber surface and the convergent-divergent nozzle head including a nozzle surface that have surface roughnesses of 100-300 Ra.

* * * * *